June 7, 1966             G. L. HANSEN             3,254,439

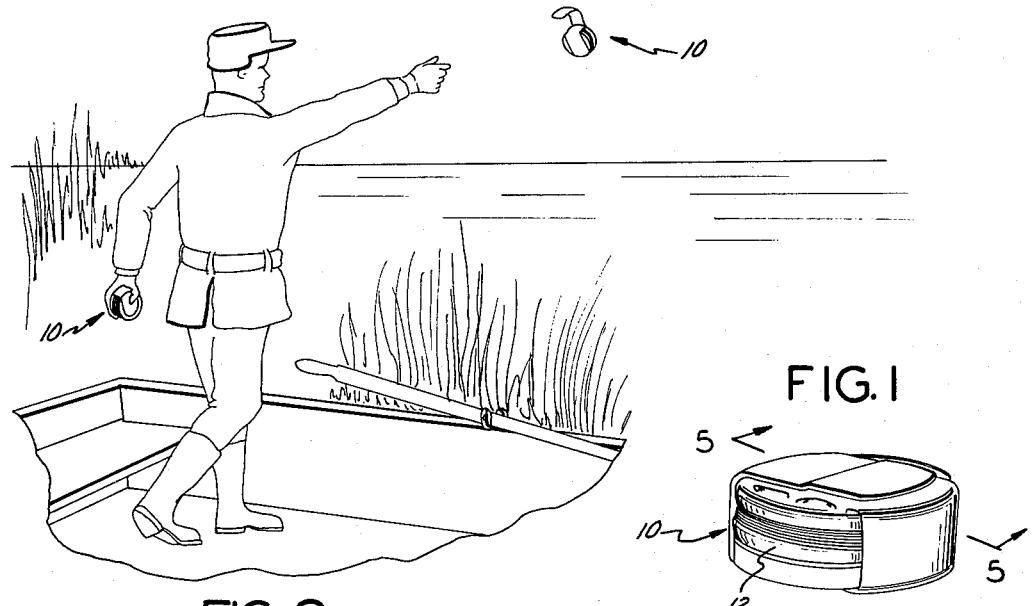
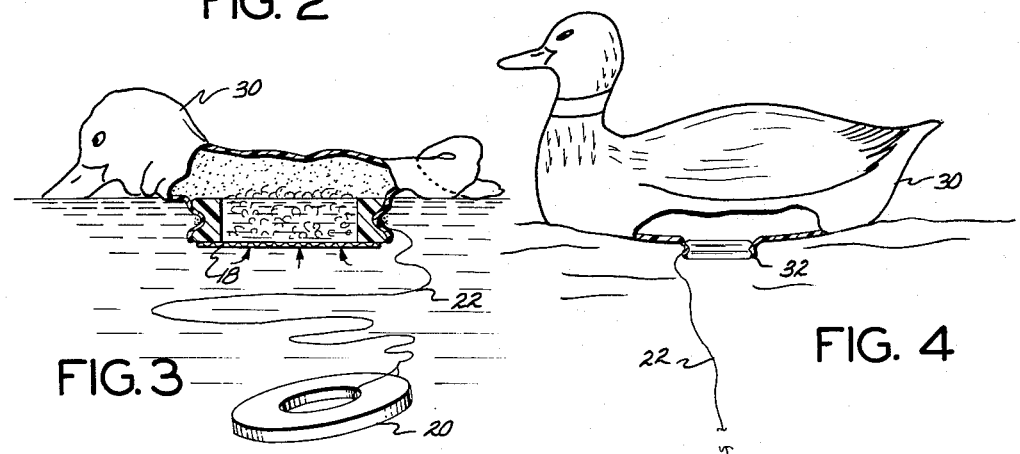
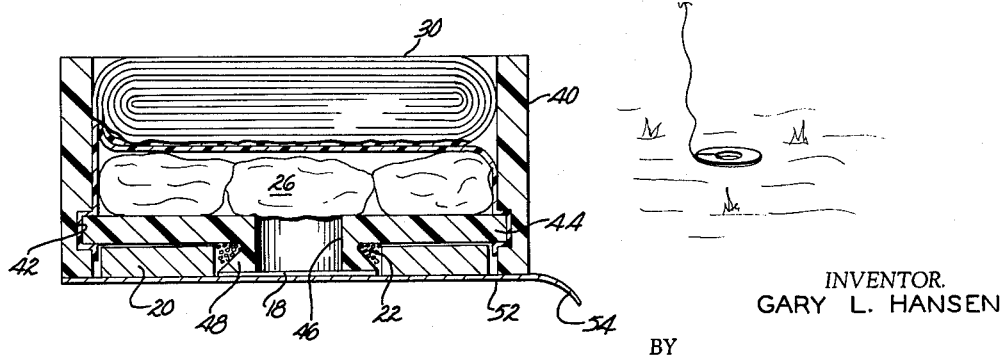

AUTOMATIC INFLATING EXPENDABLE DECOY

Original Filed May 20, 1963             2 Sheets-Sheet 2

INVENTOR.
GARY L. HANSEN

BY

ATTORNEY

United States Patent Office 3,254,439
Patented June 7, 1966

3,254,439
AUTOMATIC INFLATING EXPENDABLE DECOY
Gary L. Hansen, Pomona, Calif.
(2820 South 2520 East, Salt Lake City, Utah)
Continuation of application Ser. No. 281,728, May 20, 1963. This application Mar. 4, 1965, Ser. No. 438,829
10 Claims. (Cl. 43—3)

The present application is a continuation of now abandoned application Serial No. 281,728, filed May 20, 1963.

The present invention relates generally to improvements in water fowl decoy; more particularly, the invention relates to an expendable water fowl decoy of flexible material which is activated to automatically inflate when thrown into the water for use.

The present invention provides an automatic inflating expendable decoy, which before activation has the form of a compact economical package that is thrown by a hunter to a selected position on the surface of the water, and which after contacting the water automatically inflates to simulate the hunted fowl and automatically anchors itself at the selected position. The decoy is sufficiently inexpensive that it is expendable and need not be retrieved for future use. By simulating a fowl of the type being hunted, the decoy serves to attract fowl of that type, such as ducks or geese, to the vicinity of the hunter.

The decoy of the invention comprises an inflatable envelope, preferably configured to simulate the fowl being hunted, which is automatically inflatable and which, prior to activation of the decoy, facilitates the provision of a compact and easily handled unit. The compact unit or package is relatively light in weight and can easily be thrown by a hunter to a selected location in the water. A chemical compound contained in the unit generates gas, when contacted by the water, thereby inflating the envelope to the configuration of the fowl. An anchor weight is automatically released and its anchor line unwinds, so that the anchor drops to the bottom of the body of water to retain the decoy at the selected location.

It is therefore an object of the present invention to provide a novel automatic inflating expendable water fowl decoy.

An object of the invention is the provision of a decoy according to the foregoing object wherein an envelope simulating the fowl is automatically inflated after contacting the water by a compound in the decoy.

An object of this invention is to provide a decoy according to the foregoing objects which is sufficiently inexpensive to be expendable.

An object of the invention is the provision of a decoy according to certain of the foregoing objects which, prior to activation, constitutes a compact unit or package of relatively light weight which may readily be thrown by a hunter to a selected position in the water, and which may be conveniently packaged and carried with a plurality of similar decoys.

An object of the invention is the provision of a decoy according to the foregoing objects, wherein an anchor weight is automatically released and lowered while the envelope is inflated.

Other objects, features and advantages of the present invention will become apparent to those versed in the art from a consideration of the following description, the appended claims and the accompanying drawings, wherein:

FIGURE 1 is a perspective view of a preferred embodiment of the decoy of the present invention, shown as a wrapped compact package prior to activation;

FIGURE 2 is a pictorial view showing a decoy according to the invention in flight after being thrown by a hunter, prior to its activation;

FIGURE 3 is an elevational view, partially in section, showing the decoy of FIGURE 1 during its automatic inflation and the dropping of its anchor after being thrown into the water for activation and use;

FIGURE 4 is an elevational view, partially in section, showing the decoy of FIGURES 1 and 3 after the automatic inflation thereof and the dropping of its anchor;

FIGURE 8 is an elevational sectional view of another embodiment of the decoy of the invention, showing the decoy prior to activation.

Figure 5:
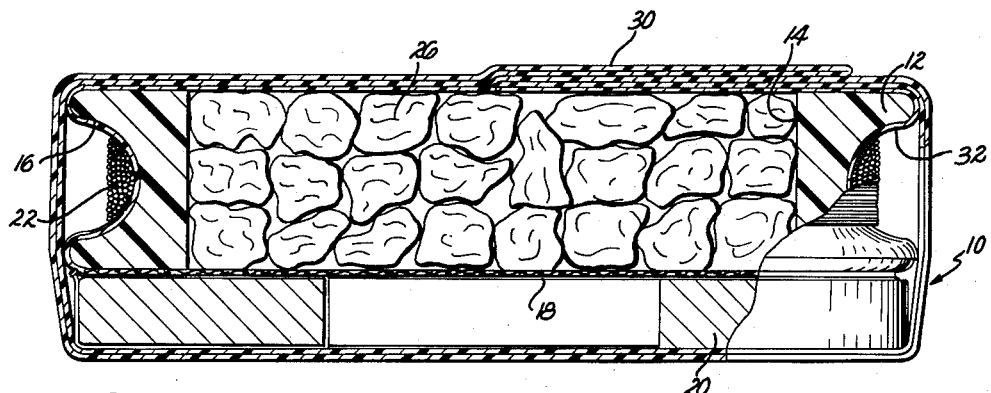
FIGURE 5 is an enlarged sectional view of the decoy of FIGURE 1, showing details of the wrapped decoy prior to activation.
Figure 6:
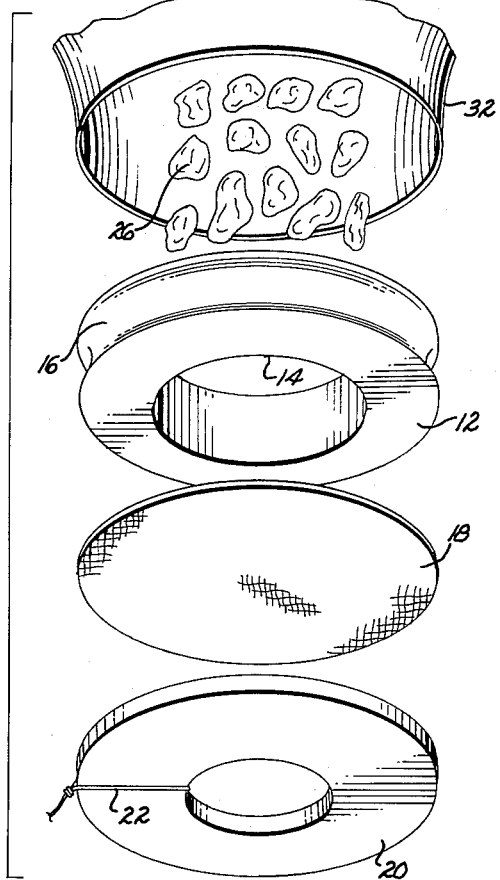
FIGURE 6 is an exploded perspective view showing details of the decoy of FIGURE 5.

Referring to the drawings, and particularly FIGURES 1 and 5, a preferred embodiment of the inflatable decoy 10 of the present invention is shown as comprising a plastic base ring 12 having an axial or central opening 14 and a peripheral recess or groove 16 of arcuate cross-section. A permeable membrane 18 is secured, as by cementing, across the lower surface of the ring and the opening 14. The permeable membrane may preferably be fabricated of cloth, paper or porous plastic. An annular anchor weight 20, preferably made of metal, is adapted to be assembled adjacent to the base ring 12 and to cooperate with the base ring to provide a convenient, compact unitary configuration. An anchor cord or line 22 is secured as by tying in the groove 16, and is wound therein. Lumps or granules of a gas-generating compound 26 are disposed within the axial opening 14 of the base ring 12, as shown. The compound 26 produces gas when contacted by water, and is preferably calcium carbide ($CaC_2$), a relatively inexpensive compound which is widely used in producing acetylene.

A plastic envelope 30, preferably configured when inflated to simulate the appearance of a fowl, has a neck portion 32 adapted to fit about the base ring 16. This neck portion 32 is secured in the groove 16 of the base ring by the anchor cord 22 which is tied around the neck portion. Further securement and sealing may be provided by a rubber band (not shown) and/or by cementing the envelope neck portion in the groove.

The envelope 30 is preferably fabricated by being molded or formed in the 3-dimensional configuration into which it is inflatable, utilizing conventional inexpensive pressure and heat forming methods. The envelope may also be fabricated by first cutting sheets of a material such as vinyl plastic to provide two sheets having an appropriate fowl-resembling configuration, then sealing the peripheries of the sheet together, as by the application of heat. After the envelope is formed, appropriate markings and colorings are preferably applied to resemble a particular fowl, these being applied by painting, printing or other means.

When initially packaged, the decoy unit is preferably inserted in a moisture-proof container, such as a plastic bag (not shown). The container serves to aid in retaining the envelope 30 tightly wrapped about the base ring 12 and the anchor weight and to maintain the unit in a clean condition, in addition to preventing moisture from reaching and reacting with the compound 26, thereby preventing decomposition of the compound 26 during storage and handling. In preparing the decoy the envelope 30 is wound or wrapped around the base ring 12 into the configuration illustrated in FIGURE 5.

In the utilization of the decoy of the invention at a hunting site, the unit is removed from the outer container.

or bag (not shown) in such a manner that the envelope 30 is not prematurely unwound.

As indicated in FIGURE 2, the hunter then hurls the decoy through the air to a selected position on the surface of the water. Ordinarily, the envelope 30 partially unwinds from the ring 12 prior to landing on the surface of the water.

Referring to FIGURE 3, after the decoy lands on the water, the water seeps or passes through the permeable membrane 18 and reacts with the compound 26, thereby producing gas which inflates the envelope 30 and completes the unwrapping of the envelope from the ring 12. The envelope 30 is inflated to an upright position and to a firm configuration, as indicated in FIGURE 4. Whatever the orientation of the unit when it lands in the water, the inflating envelope, being buoyant, naturally assumes the upright position shown in FIGURE 4, and the heavier plastic base ring 12 and anchor 20 assumes the lower position.

The gas is retained in the envelope by the underwater base ring and envelope structures. Gas at low pressure cannot pass outwardly through the membrane 18, even though a portion of the membrane may initially be above the surface of the water during the inflation of the envelope 30, because the surface tension within the saturated membrane, combined with the effects of contamination of the membrane with the by-product of the chemical reaction of the compound 26 with the water. Therefore, substantially all of the gas produced by the chemical reaction, or at least all that is required for proper inflation of the envelope 30, is captured and retained within the envelope. As hereinbefore stated, the compound 26 is preferably calcium carbide ($CaC_2$), and gas is produced in accordance with the following reaction:

$$CaC_2 + 2H_2O \rightarrow C_2H_2\uparrow + Ca(OH)_2$$

While the envelope is inflating as described above, the unwrapping of the envelope 30 from about the base ring 12 and the anchor weight 20, releases the anchor weight, whereupon it falls freely to the bottom of the lake or body of water, thereby anchoring the decoy in place by means of the anchor line 22.

The inflated and anchored decoy simulates the fowl being hunted. The decoy is in a clean and new condition, having until activation been wrapped and enclosed in a container or bag.

The decoy is readily positioned as desired, merely by throwing the wrapped unit to a selected position on the surface of the water, the inflated decoy remaining where positioned because of the automatic anchoring. The hunter need not bother to recover or retrieve the decoys or decoy because they are sufficiently inexpensive to be expendable. The units are sufficiently compact that a number of them, for example two dozen, may be carried by the hunter.

Various modifications may be resorted to in practicing the invention, in addition to the preferred embodiment hereinbefore described. In FIGURE 8 there is shown a modification wherein the inflatable envelope 30 is packed within a plastic tube 40, which has an inner annular groove 42 configured to receive the periphery of a modified plastic base ring 44. The neck portion of the envelope is secured by the ring in the groove 42, and is preferably cemented therein to insure pressure sealing. An axial opening 46 extends through the base ring. A reduced central or neck portion 48 of the ring is flared to define an annular groove or recess, as shown, in which the anchor line 22 is wound. The anchor weight 20 fits against the plastic base ring 44 and about the extending portion 48. A porous membrane 18 like that of the previous embodiment, is cemented to the end of ring portion 48 to cover the opening or bore 46. The porous membrane serves the same purpose as the porous membrane 18 of the embodiment shown in FIGURE 5. A moisture sealing element 52, preferably a layer of pressure-sensitive material, is secured across the bottom of the unit or package, as shown, the seal 52 adhering to the end surface of the tube 40, to the anchor weight 20 and to the porous membrane 18 on the end surface of ring portion 48. The moisture seal is easily removed by pulling its tab portion 54 prior to using the decoy. The seal 52 obviates the necessity for packing the decoy unit in a moisture-proof bag or container, the compound 26 which must be protected from atmospheric moisture, is sealed between the moisture seal 52 and the inflatable envelope 30, as shown in FIGURE 8.

Figure 7:
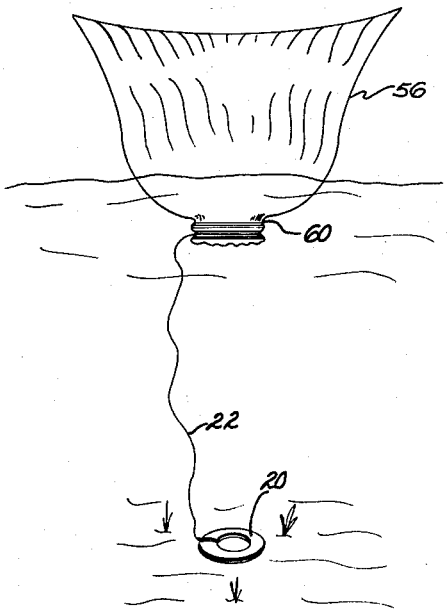
FIGURE 7 is an elevational view, similar to the view of FIGURE 4, showing a modified form of the invention.

FIGURE 7 illustrates a modified form of inflatable envelope 56, which may be utilized with either of the embodiments hereinbefore described. Envelope 56 is a conventional rectangular plastic bag, which is not specially configured to simulate a fowl. By painting, printing or other means, appropriate markings, coloring and indicia are placed on the envelope to simulate the fowl. The opening or neck of the envelope is gathered, as indicated at 60, and is secured to the plastic base ring in the same manner as the envelope neck of the embodiment of FIGURES 3 and 5 is secured. Utilization of conventional plastic envelopes or bags reduces the cost of fabricating the unit.

From the foregoing description, those versed in the art will observe that the present invention realizes the advantages and achieves the objects hereinbefore mentioned, and that the invention provides additional advantages which are apparent from the detailed description.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. An automatic inflatable expendable water fowl decoy comprising a flexible inflatable envelope configured when inflated to represent a water fowl to be attracted by the decoy, a quantity of gas-generating compound for generating envelope-inflating gas upon contact of the compound with water, means holding the gas-generating compound in communication with said envelope and including a porous membrane to allow access of water to the compound when the decoy is deposited in the water, whereby the envelope is automatically inflated when the decoy is deposited in the water, said envelope when deflated being adapted to be wrapped about the gas-generating compound and the holding means to permit the decoy to be cast as a compact unit to a desired location on a body of water, an annular groove about said means holding the gas generating compound, a cord tied at one end thereof to said holding means and wrapped about said groove, and an anchor tied to the other end of said cord, said anchor being held adjacent said holding means by the wrapping of said envelope thereabout, whereby activation of the decoy is effected by the unwrapping of the envelope and the generation of the envelope-inflating gas at the pre-selected site in the water, said anchor thereby dropping from said holding means at that site to anchor the fowl decoy at said site on said cord.

2. An automatic inflatable expendable water fowl decoy comprising a flexible inflatable envelope having an entrance aperture and being configured when inflated to represent a water fowl to be attracted by the decoy, gas-generating means sealed in said entrance aperture in the decoy to inflate the decoy when the generating means is activated, said gas-generating means including a gas-generating compound adapted to be automatically activated when brought into contact with water, the gas generating means having a member to allow access of the water to the gas generating compound when the decoy is in use, and an anchor weight connected with the gas generating means by a cord to drop free thereof on said cord after the decoy is cast into the water, said envelope being initially wrapped adjacent to the gas-generating means and anchor weight to maintain a compact unitary configuration adapted to be tossed to a pre-selected site in the water where said anchor weight falls away from said gas generating means as said envelope is inflated thereby anchoring said fowl decoy at the preselected site.

3. An automatic inflatable expendable water fowl decoy comprising a flexible inflatable envelope configured when inflated to represent a water fowl to be attracted by the decoy, means including a gas-generating compound cooperating with the envelope for the inflation thereof upon the deposition of the decoy in the water to attract water fowl, and an anchor weight operatively connected with said envelope by an anchor line, the anchor weight being freely associated with the envelope so as to drop free thereof and connected thereto only by said line when the decoy is cast into the water and the envelope is inflated, said envelope being initially wrapped about the envelope-inflating means and anchor weight to maintan a compact unitary configuration adapted to be tossed as a unit to a pre-selected site in the water, whereby the decoy automatically inflates and becomes anchored at the pre-selected site in the water.

4. An automatic inflatable expendable water fowl decoy comprising a flexible inflatable envelope configured when inflated to represent a water fowl to be attracted by the decoy, a base member attached to the envelope in an opening in the envelope, a quantity of gas-generating compound held by means including said base member to generate envelope-inflating gas upon contact of the compound with water when the decoy is deposited in the water, said base member being constructed to provide access of the water to the gas-generating compound to inflate the envelope when the decoy is in the water, and anchor means operatively connected by an anchor line with said base member so as to drop free thereof on said line after the decoy is in the water.

5. An automatic inflatable expendable water fowl decoy according to claim 4, wherein the said base member has an annular configuration defining an aperture extending therethrough in which said gas-generating compound is packed prior to activation of the decoy, and wherein a neck portion of the envelope defines an opening wherein said base member is secured, and further wherein said means for holding the gas-generating compound includes a porous membrane secured to the base member to cover said aperture in the base member, said porous member having the characteristic of admitting water therethrough and when water-saturated of retaining the generated gas, whereby water is admitted to the gas-generating compound through the membrane upon deposition of the decoy in the water to generate gas for inflating the envelope, and whereby the generated gas is retained in the envelope by the membrane upon activation of the decoy.

6. An automatic inflatable expendable water fowl decoy comprising a flexible inflatable envelope configured when inflated to represent a water fowl to be attracted by the decoy, a base member attached to the envelope at an envelope opening, a gas-generating compound held by means including said base member for the generation of envelope-inflating gas upon contact of said compound with water when the decoy is deposited in the water, and an anchor member freely associated with the base member and being free to drop away therefrom when the decoy is deposited into the water, an anchor line connecting the anchor weight to the base member whereby upon anchor member droppng away the decoy becomes anchored by the anchor member, said anchor weight being normally positioned adjacent to the base member, said base member having an annular peripheral groove wherein the anchor line is normally wound, said envelope being initially wrapped about the base member, the anchor weight and the anchor line to maintain a compact unitary configuration adapted to be tossed to a pre-selected site in the water, whereby activation of the decoy is effected by the unwrapping of the envelope, the generation of the envelope-inflating gas and the anchor weight dropping away at the pre-selected site in the water.

7. An automatic inflatable expendable water fowl decoy comprising a flexible inflatable envelope configured when inflated to represent a water fowl to be attracted by the decoy, said envelope being provided with a depending neck portion having an opening therein communicating with the interior of said envelope, a base member provided with an annular configuration having an opening through the central portion thereof and an annular groove in the periphery thereof, said base member being seated in said neck portion with the openings in said base member and neck portion in alignment, an anchor line having one end portion tied around said neck portion and the groove in said base member and its other end portion secured to a flat surface weight member, a porous membrane secured to the bottom of said base member to cover said opening therein, a quantity of gas generating compound positioned in said opening in said base member and supported therein by said membrane, whereby the free portion of said anchor line is adapted to be releasably wound about said base member in the groove thereof and the flat surface of said weight member placed in contact with said membrane, and whereby said envelope, when deflated, being adapted to be wrapped about said base member, membrane and weight to permit the decoy to be cast as a compact unit to a desired location on a body of water.

8. An automatic inflatable expendable water fowl decoy comprising a tube member, a flexible inflatable envelope adapted to represent a water fowl to be attracted by the decoy, said envelope being packed within said tube prior to inflation thereof, a solid base member fitted within the tube with a neck portion of the envelope secured between the tube and the base member, and a gas-generating compound held within the tube by means including the base member for the automatic generation of envelope-inflating gas upon contact of the compound with water when the decoy is deposited in the water.

9. An automatic inflatable expendable water fowl decoy according to claim 8, wherein said base member has a reduced extending neck portion defining a central bore, and further including an anchor weight, and an anchor cord wound in an annular recess defined by said base member neck portion.

10. An automatic inflatable expendable water fowl decoy according to claim 8, and further including a porous membrane secured to the base member to cover said base member opening and thereby enclose the envelope, whereby water is admitted to the gas-generating compound upon the deposition of the decoy in the water to generate gas to inflate the envelope, and whereby gas is retained in the envelope by the membrane when wet after activation of the decoy.

References Cited by the Examiner
UNITED STATES PATENTS

| | | | |
|---|---|---|---|
| 395,612 | 1/1889 | Curlin | 43—3 |
| 923,801 | 6/1909 | Bargar | 9—321 |
| 2,752,615 | 7/1956 | Parker | 9—9 |

SAMUEL KOREN, *Primary Examiner.*

W. H. CAMP, *Assistant Examiner.*